United States Patent [19]

Mosley et al.

[11] 3,995,963
[45] Dec. 7, 1976

[54] SLIDING ARM LOCK ASSEMBLY

[75] Inventors: Kenneth C. Mosley, Grand Rapids; Clare E. Barkalow, Comstock Park, both of Mich.

[73] Assignee: Michigan Instruments, Inc., Grand Rapids, Mich.

[22] Filed: Feb. 18, 1975

[21] Appl. No.: 550,602

[52] U.S. Cl. .............................. 403/104; 403/110; 248/125; 408/237
[51] Int. Cl.² ...................... F16B 7/10; F16D 1/12
[58] Field of Search .......... 403/109, 110, 355, 104, 403/164, 41, 33, 24; 272/62, 63, 64; 248/124, 125, 295; 408/236, 240, 241, 237, 90; 279/18, 80, 86

[56] References Cited

UNITED STATES PATENTS

| | | | |
|---|---|---|---|
| 2,124,006 | 7/1938 | Parker | 248/124 |
| 3,112,116 | 11/1963 | Seitz | 403/291 X |
| 3,255,641 | 6/1966 | Russell | 403/355 X |
| 3,373,658 | 3/1968 | Larsen | 408/237 X |
| 3,402,952 | 9/1968 | Nissen et al. | 272/62 X |

FOREIGN PATENTS OR APPLICATIONS 671,920   2/1939   Germany ........................... 403/355

*Primary Examiner*—Wayne L. Shedd
*Attorney, Agent, or Firm*—Price, Heneveld, Huizenga & Cooper

[57] ABSTRACT

A locking member is positionable within an opening in the arm and is likewise engageable with a post and slidable jointly with the arm along the axis of the post to initiate a clamping force. A shaft having a handle assembly on one end is threadable in the locking member and hand rotatable to move the locking member laterally relative the post to secure the arm and post together at selected positions relative each other. A spring means in the handle assembly provides increased turning torque as the lock is tightened and at a preselected designing load, a brake member overrides the washer to prevent further hand tightening.

17 Claims, 3 Drawing Figures

SLIDING ARM LOCK ASSEMBLY

BACKGROUND OF THE INVENTION

This invention relates to a sliding arm lock assembly particularly adapted for use in a cardiac compressor having a base platform assembly, support pillar or post and a compressor arm slidably supported by the post.

FIG. 1 of the drawings illustrates in perspective such a unit and the lock assembly 10 is adapted to be manually controlled to permit positioning the arm 12 at different positions relative post 14 and platform assembly 16. One prior art embodiment is illustrated and described in commonly assigned U.S. Pat. No. 3,364,924 issued Jan. 23, 1968. In the type of prior art embodiment described in the above identified patent, the compression arm includes a peripheral collar which is rotatable on the support post and vertically slidable when the locking means is loosened. The locking means includes either a pair of generally cylindrical abutting elements or a single cylindrical element with a threaded stud extending therefrom having a handle or the like attached to one end for manual loosening and tightening. The cylindrical element or elements include a saddle-shaped seat portion for abutment with the periphery of the post to bind the assembly when the knob or handle is tightened. To bind the assembly, the knob is rotated so that the collar presses the cylindrical element toward the post to secure and bind the assembly. While this type of lock assembly works adequately, there are several disadvantages that are significantly overcome by the subject invention. To begin with, the prior art tightening mechanisms were subject to overtightening which resulted in reduced effectiveness or failure in the threaded shaft requiring replacement of the lock assembly. Too much torque could be applied resulting in repeated over stressing of the assembly. The assembly of course has to be manipulated by a variety of different types of persons and hence too little torque advantage could easily result in certain people not being able to tighten the assembly up adequately enough under certain uses. A second distinct drawback was the propensity when adjusting the compressor arm relative the post to unintentionally lift the compressor arm up sufficiently high enough toward the upper end of the post such that the locking assembly became displaced or misaligned relative the post therefore preventing further operation until the parts were carefully aligned once more. Thus, there is a need in this art for an improved sliding arm lock assembly.

SUMMARY OF THE INVENTION

The subject invention is described with particular reference to a cardiac compressor that includes a base platform assembly; an upstanding support post and compressor arm which extends radially from the post and includes a collar surrounding the post. The arm includes an opening in association with the collar for receipt of a locking or clamping member having a seat formed thereon configurated for cooperation with the post such that when the locking member is aligned within the opening and the seat is aligned with the post, the locking member is positionable between a released position wherein the arm can be slidingly moved along the axis of the post and a lock position wherein the arm is securely held rigidly relative the post.

In accordance with the invention, the locking member includes a threaded shaft and handle assembly on one end for rotation thereof. The handle assembly includes a spring means which cooperates with the arm increasing the turning torque required as the force between the locking member and post is increased. At a preselected torque, a brake means on the handle assembly seats relative the arm restricting further manual manipulation of the handle assembly to avoid excess stress or failure of the locking assembly. Preferably, a thrust washer is positioned intermediate the spring means and arm so that when the handle is rotated, the washer abuts the arm causing the locking member to move relative the post into a locked position. The spring means may comprise a conical washer which becomes more flattened as the locking member is tightened.

In more narrower aspects of the invention, means are provided to prevent unintentional removement and misalignment of the locking member while positioned in the compressor arm opening and adjustment means are provided in order to neutralize tolerance variation in parts.

The subject invention is extremely advantageous over the prior art in that it now provides a facile locking assembly which can be hand tightened by a variety of people of different physical strengths without varying the degree of tightness in the locking assembly. The leverage provided by the locking assembly of the subject invention permits almost any person to hand tighten easily to the varied desired level of torque at which point the lock assembly is adequately and safely tightened for operation of the cardiac compressor. The improved operation and ease with which it can be manipulated permits faster adjustment under conditions of emergency thereby increasing the overall speed and utility with which the cardiac compressor can be utilized by different skilled people. The locking means preventing unintentional removal or misalignment of the locking member adds further utility and speed of operation. The various adjustment means provided to neutralize tolerance variation in parts provides a better more economically feasible commercial product at lower cost.

DESCRIPTION OF THE PREFERRED EMBODIMENT

Figure 1:
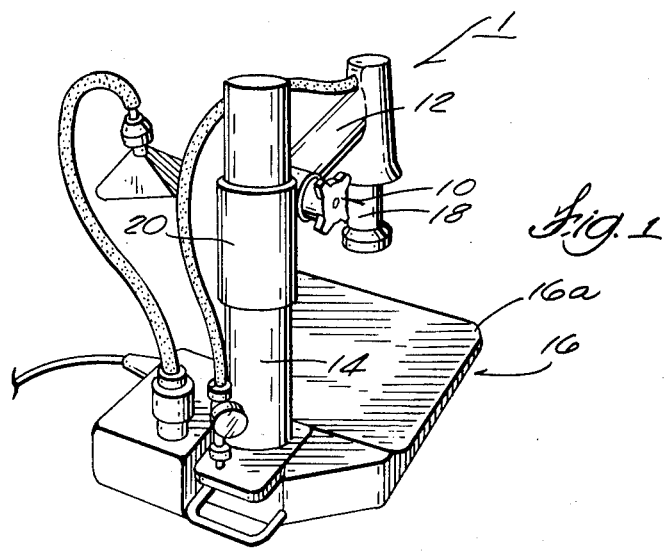
FIG. 1 is a perspective view showing a cardiac compressor utilizing the subject sliding arm lock assembly.

Referring now specifically to the drawings, a cardiac compressor assembly 1 includes the base platform subassembly 16, support pillar or post 14 extending upwardly from one edge of the rigid platform 16a of subassembly 16 and a compressor arm 12 extending out over the base plate or platform 16a. The compressor arm 12 has a plunger subassembly 18 mounted to the other end of arm 12 over the platform. The operation of the cardiac compressor illustrated need not be described in detail since it is well known in the art. A principal function is to depress the plunger subassembly 18 on the chest of a patient positioned over platform 16a to provide external cardial compression. Since the size of patients varies considerably, it is desirable to adjust the relative heights of compressor arm 12 over platform 16a and in furtherance thereof, compressor arm 12 includes a collar 20 at one end which surrounds post 14 and although closely fit thereover, includes internal clearance permitting easy movement of compressor arm axially relative post 14 as well as in positions of rotation thereabout. The sliding arm lock assembly 10 of the subject invention can be tightened to rigidly secure compressor arm 12 at any desired position relative post 14 and alternatively can be loosened to permit adjustment to any desired position. While the subject invention is described in particular detail with reference to a cardiac compressor, it will be appreciated that it could be utilized in a variety of different environments.

Figure 2:
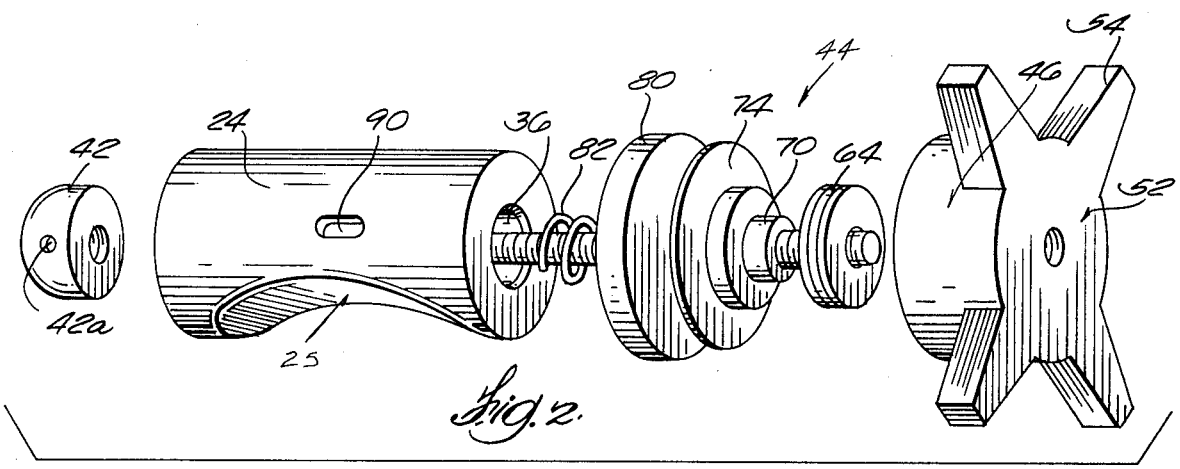
FIG. 2 is an exploded view in perspective of the lock assembly.
Figure 3:
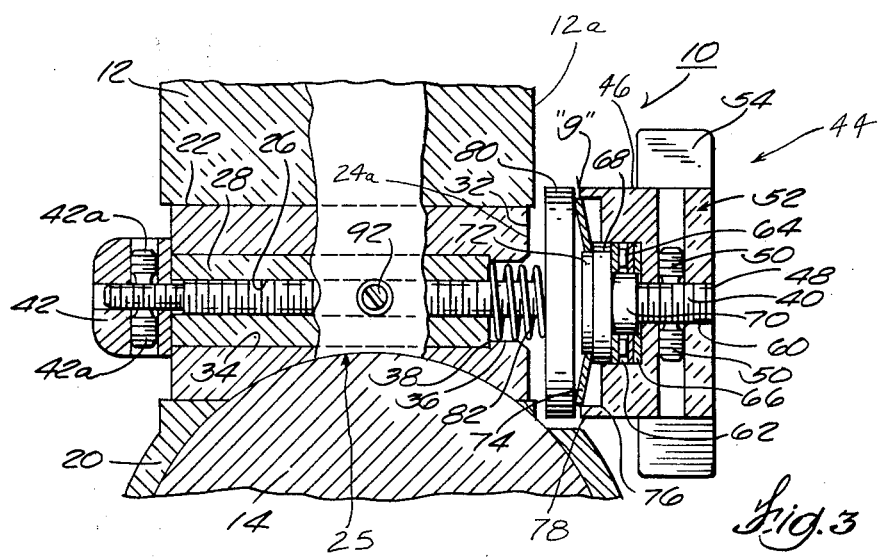
FIG. 3 is a fragmentary cross-sectional planned view of the subject invention.

Referring now specifically to FIGS. 2 and 3, the particular details of lock assembly 10 will be described. Compressor arm 12 includes a lateral opening 22 extending through arm 12 and also having an exposed opening 23 opening into collar 20 at the transition between collar 20 and the one end of arm 12. The sliding lock assembly 10 includes a cylindrical locking member 24 having a generally saddle-shaped seat 25. The seat 25 has a radius of curvature corresponding generally to that of post 14 (FIG. 3) although relative movement is permitted between the parts when loosened. Locking member 24 includes an internal threaded passageway 26 extending axially through locking member 24. Preferably, passageway 26 is formed in a shrink fit insert 28 which extends from one end 30 of locking member 24 but not quite through to the opposite end 32 for reasons which will be explained hereinafter. The inner end 24a of locking member 24 does not extend to the surface 12a of arm 12 to permit a handle assembly 44 to bear up against arm 12 (or surface 12a) thus providing the relative clamping movement of locking member 24 and post 14. An internal opening 36 is formed in locking member 24 and at end 32, includes a stepped interior wall forming a stop 38 which prevents insert 28 from being positioned completely to end 32. Internal passageway 28 is threaded for receipt of a shaft 40 which includes a nut 42 anchored to one end by set screws 42a. A handle assembly 44 is secured to the opposite end 48 of shaft 40 and includes a hub portion 52 secured to end 48 by set screws 50, 50 extending radially through the hub. Hub 52 includes radially projecting thumb portions 54 formed integrally therewith. The hub also includes an axially extending annular shell 46 defining a stepped inner cross-sectional portion comprising: a first portion 60 in which shaft 48 is secured; a second portion 62 of greater cross-sectional width which houses an antifrictional thrust roller bearing 64, selected shims 66, and at least part of a thrust washer 68 which fetches up against or bears against bearing 62; and a third portion 76 of yet greater cross-sectional width which houses the remainder of thrust washer 68 and conical washer. Thrust washer 68 includes a stepped down portion 70 which bearing 62 seats on and a diametrically opposite reduced portion 72 in which is seated the conical washer 74. Conical washer 74 when positioned within hub portion 76 extends in its expanded position slightly beyond the plane of the terminal end 78 of hub shell 46. A large thrust washer 80 is biased into abutment against conical washer 74 and spaced from the terminal ends 78 of hub member 52 by conical washer 74. This spacing defined as gap "g" can be reduced to zero by applying appropriate compression force to conical washer 74 by rotation of handle assembly 44. The large thrust washer 80 is designed for abutment on the opposite side against compressor arm 12. The washer 80 is biased against conical washer 74 during a loosened condition of the assembly by a spring 82 positioned about shaft 48 held against the recessed end of insert 28.

OPERATION

Having described the basic elements of the sliding arm lock assembly 10, its operation should be well understood. With the locking assembly 10 positioned in opening 22 in compressor arm 12, and aligned relative post 14 such that the saddle-shaped seat 25 is in tongue and groove relationship with post 14. In order to tighten the compressor arm 12 to post 14, knob 46 is rotated causing handle assembly 66 to advance toward compressor arm 12 until the large thrust washer 80 comes into abutment with the side of compressor arm 12. Further tightening will then cause reactionary movement of locking member 24 toward handle assembly 44 causing the locking wedge engagement between seat 25 and post 14. As the torque increases due to this tightening, conical washer 74 will flex inwardly within the third portion 76 of the internal handle hub member 52. This will cause the turning torque required to increase slightly but still provide relatively easy manipulation due to the cooperation between large washer 80, conical washer 74 and thrust roller bearing 64. Continued tightening however eventually causes the terminal annular end portion 78 of shell 46 to come into physical contact with and seat on large washer 80 completely destroying the mechanical advantage of the assembly due to rubbing friction at a relatively large moment arm introduced by such physical contact. This restricts further flattening of conical washer 72 and the direct loading in this position acts as a brake to further manual tightening thereby limiting the force between seat 25 and post 14. By appropriately designing the force factor in the conical washer 74, the brake will take effect at the very preselected load desired for the lock assembly. The brake will thus prevent overstressing of the lock assembly. In order to compensate for tolerance variation in the parts, shims 66 are utilized to adjust to the different axial variations. Also, nut 42 is adjustable along shaft 40 to limit excessive loosening of handle assembly 44. Loosening of set screws 42a permits this adjustment.

An ancillary feature to the subject invention is the provision of a slot 90 (FIG. 2) for receipt of a screw 92 threaded into the arm assembly after locking member 24 is properly inserted and aligned with post 14. Screw 92 is threaded into a tapped hole 94 at the top of arm 12 next to post 14 and extends loosely into slot 90. When in place, screw 92 will prevent accidental removal, or excessive rotation, of the arm lock assembly 10 should the arm ever be raised above the end of the column. This greatly facilitates complete utilization of the cardiac compressor without causing unnecessary delay due to inadvertent misalignment of the locking member when the cardiac compressor arm 12 is either removed from post 14 or rotated thereabout at its upper end.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. An arm lock assembly for securing an arm to a post comprising, in combination: a locking member having a configurated seat for clamping engagement with the post; a shaft threaded axially through said locking member and having at least one end extending beyond said locking member; a handle means secured to said one end of said shaft for rotating said shaft causing relative axial displacement between said shaft and locking member; spring means cooperative with said handle means and cooperatively engaging with the arm to produce a clamping force between said locking member and the post, said spring means yielding as the clamping force increases between said locking member and the post; and brake means engaged by said handle means and cooperatively engaging with the arm and limiting further tightening of said lock assembly when a predetermined level of tightness is reached, said spring means is a conical washer mounted on said shaft, said conical washer adapted to deflect as said lock assembly is tightened and thereby increasing the clamping force between said locking member and the post, and wherein said handle means includes a hub with a portion thereof extending beyond said conical washer and having a diameter exceeding that of said conical washer, said hub comprising said brake means and restricting further deflection of said conical washer when said predetermined level of tightness is reached.

2. The arm lock assembly according to claim 1 and further including a thrust washer on said shaft freely positioned intermediate said conical washer and locking member, said thrust washer having a diameter corresponding at least to said brake means and abutting said conical washer defining a gap between said brake means and conical washer when said lock assembly is loosened, said gap being eliminated when said predetermined load is reached.

3. The arm lock assembly according to claim 2 wherein said hub is hollow with an open and closed end, said open end facing said thrust washer, said assembly further including a second thrust washer on said shaft, said second thurst washer having a stepped cross section for receiving and indexing said conical washer thereon and a bearing means likewise indexed on said second thrust washer intermediate said conical washer and said closed end of said hub, said bearing means facilitating rotation of said handle means to tighten said lock assembly.

4. The arm lock assembly according to claim 5 wherein said lock assembly further includes one or more shims positionable on said shaft intermediate said bearing means and closed end of said handle means said shims comprising an adjustment means of arbitrary thickness to neutralize tolerance variation in said parts.

5. An arm lock assembly for securing an arm to a post comprising, in combination: a clamping member having a configurated seat for clamping engagement with a post; a shaft threaded axially through said clamping member and having at least one end extending beyond said clamping member; a handle means secured to said one end of said shaft for rotating said shaft causing relative axial displacement between said shaft and clamping member; spring means cooperative with said handle means and cooperatively engaging with an arm to produce a clamping force between said clamping member and a post, said spring means yielding as the clamping force increases between said clamping member and a post; and brake means moved by said handle means cooperatively engaging with an arm to restrict further tightening of said lock assembly when a predetermined level of tightness is reached; said locking member is cylindrical and said seat configuration is saddle-shaped with a radius of curvature corresponding generally to the radius of curvature of the post with which said seat is engaged with.

6. The arm lock assembly according to claim 1 wherein said locking member defines an elongated opening along its surface for receipt of a lock means associated with and secured to said arm to prevent unintentional removal of said lock assembly from an arm.

7. The arm lock assembly according to claim 1 wherein said brake means is actuated by the deflection of said spring means.

8. The arm lock assembly according to claim 1 wherein said brake means is rotatable with said handle means and is spaced from cooperative association with the arm, said space being eliminated when said predetermined level of tightness is reached.

9. The arm lock assembly according to claim 1 wherein said assembly further includes a thrust washer freely positioned on said shaft intermediate said conical washer and the arm.

10. In an arm lock assembly having a pot and an arm with a collar encapsulating said post whereby said arm is adjustable radially and axially relative said post, said arm having an opening therethrough and adjacent said post for receipt of a locking means having a locking member positioned through said opening with a configurated seat corresponding generally to the configuration of said post whereby said seat is positionable laterally relative the axis of said post between a loosened position wherein said arm is movable relative said post and a tightened position wherein said arm is secured at a desired fixed position relative said post, said locking means including a threaded shaft threadable through said locking member and having a handle means secured to one end of said shaft whereby rotation of said handle means causes relative lateral movement of said locking member relative said post to move said locking member between said loosened and tightened position, the improvement comprising: a first means for producing an increasing clamping force between said locking member and post and a second means associated with said handle means for restricting further tightening of said lock means beyond a predetermined level of tightness by cooperative engagement with said arm, said first means includes a spring means cooperative between said handle means and said arm to produce said clamping force, and said second means includes a brake means, said brake means spaced from association from said arm when said lock assembly is loosened and being brought into abutting relationship relative said arm upon deflection of said spring means when said predetermined level of tightness is reached to restrict further deflection of said spring means.

11. The improvement according to claim 10 wherein said spring means is a conical washer on said shaft intermediate said handle means and said arm whereby said clamping force is increased by said conical washer as the level of tightness increases.

12. In an arm lock assembly having a post and an arm with a collar encapsulating said post whereby said arm is adjustable radially and axially relative said post, said arm having an opening therethrough and adjacent said post for receipt of a locking means having a locking member positioned through said opening with a configurated seat corresponding generally to the configuration of said post whereby said seat is positionable laterally relative the axis of said post between a loosened position wherein said arm is movable relative said post and a tightened position wherein said arm is secured at a desired fixed position relative said post, said locking means including a threaded shaft threadable through said locking member and having a handle means secured to one end of said shaft whereby rotation of said handle means causes relative lateral movement of said locking member relative said post to move said locking member between said loosened and tightened position, the improvement comprising: a first means for producing an increasing clamping force between said locking member and post and a second means rotatable with said handle means for restricting further tightening of said lock means beyond a predetermined level of tightness; said first means includes a spring means cooperative between said handle means and said arm to produce said clamping force; said second means includes a brake means on said handle, said brake means spaced from association from said arm when said lock assembly is loosened and being brought into abutting relationship relative said arm upon deflection of said spring means when said predetermined level of tightness is reached to restrict further deflection of said spring means; said spring means is a conical washer on said shaft intermediate said handle means and said arm whereby said clamping force is increased by said conical washer as the level of tightness increases; said first means further includes a first thrust washer on said shaft intermediate said conical washer and arm, said first thrust washer being in abutment with said conical washer and adapted for abutment with said arm causing said locking member to move laterally relative said post when said handle means is rotated for tightening, and a second thrust washer on said shaft having a first section forming a seat for receipt of said conical washer and a second section forming a second seat for a bearing means, said bearing means providing ease of rotation of said handle means in cooperation between said handle means and said conical washer to permit facile tightening and loosening thereof.

13. The improvement according to claim 12 wherein said handle means includes a hollow hub having a closed and open end, said open end facing said first thrust washer, said conical washer, second thrust washer and bearing means being housed within said handle means, said first means further including one or more shims positionable intermediate said bearing means and closed end of said handle means to accommodate tolerance variance in said parts.

14. The improvement according to claim 13 wherein said handle means is removable from said shaft and said arm lock assembly further includes a nut adjustably secured to the opposite end of said shaft from said handle means.

15. The improvement according to claim 11 wherein said second means is comprised of a brake means which restricts further deflection of said conical washer when said predetermined level of tightness is reached thereby preventing further tightening of said lock assembly.

16. In an arm lock assembly having a post and an arm with a collar encapsulating said post whereby said arm is adjustable radially and axially relative said post, said arm having an opening therethrough and adjacent said post for receipt of a locking means having a locking member positioned through said opening with a configurated seat corresponding generally to the configuration of said post whereby said seat is positionable laterally relative the axis of said post between a loosened position wherein said arm is movable relative said post and a tightened position wherein said arm is secured at a desired fixed position relative said post, said locking means including a threaded shaft threadable through said locking member and having a handle means secured to one end of said shaft whereby rotation of said handle means causes relative lateral movement of said locking member relative said post to move said locking member between said loosened and tightened position, the improvement comprising: a first means for producing an increasing clamping force between said locking member and post and a second means rotatable with said handle means for restricting further tightening of said lock means beyond a predetermined level of tightness; said first means includes a spring means cooperative between said handle means and said arm to produce said clamping force; said second means includes a brake means on said handle, said brake means spaced from association from said arm when said lock assembly is loosened and being brought into abutting relationship relative said arm upon deflection of said spring means when said predetermined level of tightness is reached to restrict further deflection of said spring means; said spring means is a conical washer on said shaft intermediate said handle means and said arm whereby said clamping force is increased by said conical washer as the level of tightness increases; said second means is comprised of a brake means which restricts further deflection of said conical washer when said predetermined level of tightness is reached thereby preventing further tightening of said lock assembly; said first means further includes a thrust washer intermediate said conical washer and arm, said thrust washer having a diameter exceeding the diameter of said conical washer, said thrust washer abutting said conical washer and adapted to abut said arm when said handle means is tightened whereby further tightening of said assembly causes increased deflection of said conical washer, said handle means comprising a hollow hub having an open and closed end, the open end of said hub facing said thrust washer and including an outer shell portion exceeding the diameter of said conical washer defining a gap intermediate said thrust washer and shell when said lock assembly is loosened, said gap becoming zero when said conical washer is deflected and said lock assembly is tightened to said predetermined level of tightness whereby said shell portion seats on said thrust washer restricting further deflection of said conical washer thereby providing said brake means.

17. The improvement according to claim 10 wherein said arm includes means defining a tapped opening extending from the exterior surface of said arm to said opening therethrough for receipt of a threaded means, said locking member including means defining an opening in a portion of its external surface and being aligned with and dimensioned greater than said tapped opening when said locking member is inserted through said arm opening, said threaded element extending loosely into said means defining said opening in said locking member and thereby locking said locking member within said arm to prevent unintentional removal thereof during manipulation and movement of said arm relative said post.

\* \* \* \* \*

UNITED STATES PATENT AND TRADEMARK OFFICE
CERTIFICATE OF CORRECTION

PATENT NO. : 3,995,963
DATED : December 7, 1976
INVENTOR(S) : Kenneth C. Mosley
Clare E. Barkalow It is certified that error appears in the above-identified patent and that said Letters Patent are hereby corrected as shown below:

Abstract, line 11:

"designing" should be -- design --

Column 5, line 47:

"thurst" should be -- thrust --

Column 6, line 31:

"pot" should be -- post --

Signed and Sealed this

Third Day of May 1977

[SEAL]

Attest:

RUTH C. MASON
*Attesting Officer*

C. MARSHALL DANN
*Commissioner of Patents and Trademarks*